June 20, 1944. M. G. LEONARD 2,351,983
PROTECTIVE DEVICE HAVING ELECTRICAL RESETTING
Filed Nov. 26, 1941 2 Sheets-Sheet 2

Woven Glass

WITNESSES: Fig.5.
Edward Michaels
Nw. C. Groome

INVENTOR
Merrill G. Leonard.
BY Franklin E. Hardy
ATTORNEY

Patented June 20, 1944

2,351,983

UNITED STATES PATENT OFFICE 2,351,983

PROTECTIVE DEVICE HAVING ELECTRICAL RESETTING

Merrill G. Leonard, Sharon, Pa., assignor to Westinghouse Electric & Manufacturing Company, East Pittsburgh, Pa., a corporation of Pennsylvania Application November 26, 1941, Serial No. 420,501

8 Claims. (Cl. 177—311)

The invention relates to protective equipment for electrical apparatus and, more particularly, to circuit controlling devices for use in such electrical apparatus.

In such electrical apparatus, it is frequently desired to provide means for protecting the apparatus from damage that may be caused by overheating due to overloading the apparatus, and it is common practice to provide a circuit breaker controlled by a thermally responsive element that is operative to interrupt the load circuit of the apparatus upon the occurrence of a predetermined condition. A condition that might be used for causing the circuit breaker to operate to interrupt the load circuit is heating resulting from an overload that is sustained for too long a period. The thermally responsive element may also be effective to give an indication somewhat prior to the occurrence of a condition necessary to unload the apparatus that such a condition is nearly reached.

In distribution apparatus, where the amount of power used per unit is small, it is usual to provide the circuit breaker, as above described, for directly interrupting the load circuit on the low voltage side and to provide mechanical means having an operating handle extending outside the apparatus for manually resetting the thermally responsive control device after it has operated in response to the predetermined condition, so that the device will again be positioned to operate upon a repetition of the condition. In larger apparatus, the same type of circuit breaker device may be used as a relay for controlling a main breaker so that both sets of contacts, that is, those which control the alarm or indicating signal for indicating that the load on the apparatus is approaching the limiting value, and those which control the circuit for interrupting the main load circuit through the apparatus may both be used to control relay circuits.

In my copending application Serial No. 421,787, for Protective devices for electrical apparatus, filed December 5, 1941, and assigned to the same assignee as this application, a protective system is described in which a circuit breaker controlling device is employed that is sensitive to the condition of an electrical apparatus as determined by a thermally responsive element which is arranged to release a plurality of latch arms. One of these latch arms trips when a predetermined limiting condition on the apparatus occurs in order to effect the unloading of the apparatus, and the other trips prior to the occurrence of this limiting condition to indicate that the condition is nearly reached. This second named latch when released operates to close a circuit including a high impedance indicating device and a resetting device that when sufficiently energized operates to return the two latch arms to their initial positions from which they may be again released upon a further occurrence of the predetermined conditions of the apparatus effecting their operation.

When the operating coil of the resetting device is connected in series circuit relation with the high impedance indicating device, the resetting device is not sufficiently energized to cause its operation. It is necessary, therefore, to shunt the high impedance device from the series circuit when it is desired to effect the operation of the resetting device. In my copending application a simple switch means is shown for shunting the high impedance device from the series circuit. If such a switch is used for this purpose, and if it is closed soon after the latch arms have been tripped and before the bimetal element has had an opportunity to cool somewhat below the tripping temperatures, it is possible that the catch controlled by the bimetal element will not have returned to its latching position to engage the latches and hold them in their normal latched positions.

Since the circuit for energizing the resetting device is interrupted upon the return of the associated latch to its latched position, this device is immediately deenergized, and if the latch arm is not retained by the catch, it immediately operates as above described. If the switch for shunting the indicating device from the series circuit is maintained closed, the latches will be repeatedly operated between these two positions until the bimetal element cools sufficiently to latch them in their normal or open circuit positions. This repeated operation is undesirable for a number of reasons, and a considerable reduction in the size and cost of the resetting equipment is possible if it does not have to be sufficiently rugged to withstand this continuously repeating operation.

It is also desirable that the switch which shunts the indicating device from the series circuit be open when the latch for closing this circuit is released so that the indicating device is operative to indicate this operation.

It is an object of the invention to provide protective equipment for electrical apparatus of the above-indicated character in which means are provided for preventing repeated rapid operation of the circuit controlling element between its circuit opening and circuit closing positions.

Other objects and advantages of the invention will be apparent from the following description of a preferred embodiment thereof, reference being had to the accompanying drawings, in which:

Fig. 5 is an end view of the manually operable switch assembly.

Figure 1:
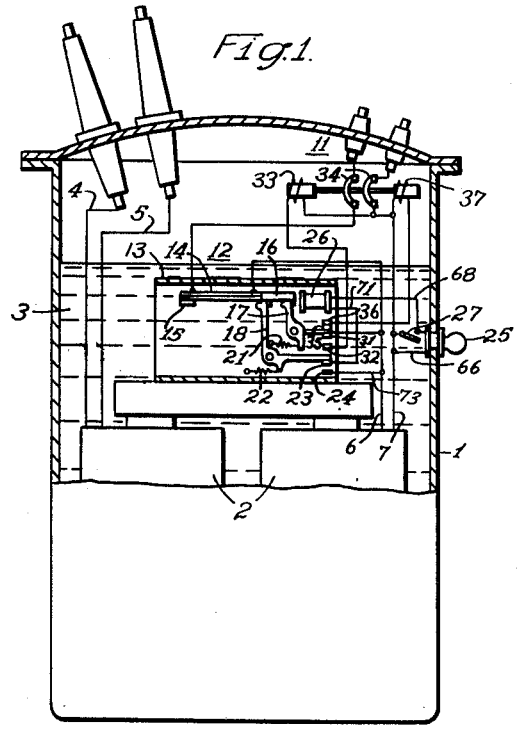
Figure 1 is a simplified diagrammatic view of circuits and apparatus illustrating the application of a thermally controlled relay device for controlling an indicating circuit and a circuit breaker control circuit.

Referring to the drawings, and more particularly to Fig. 1 thereof, an electrical apparatus is illustrated including an apparatus casing 1 housing a core and coil assembly 2 immersed in an insulating liquid 3, and provided with high-voltage terminal conductors 4 and 5 and low-voltage terminal conductors 6 and 7 which may be connected to high-voltage and low-voltage external circuits through conventional bushings in a well-known manner. A circuit breaker indicated generally at 11 is provided for connecting the conductors 6 and 7 to the outside circuit, and is controlled by a relay indicated generally at 12 immersed in the insulating liquid 3 and comprises a casing 13 enclosing a bimetal element 14 that is shown included in the circuit of conductor 6, so that the bimetal element is responsive to both the flow of current therethrough and heating resulting from the temperature of the liquid 3 in which it is immersed. The bimetal element 14 is physically arranged so that one end is mounted on a relatively fixed abutment 15, and the other end is free to move and carries a catch 16 that is adapted to engage latches 17 and 18 to normally retain them in their illustrated positions against the pull of the springs 21 and 22, respectively. The latches 17 and 18 are so arranged that the latch 18 has the lesser overlap with the catch 16, so that as the bimetal 14 is heated and the catch 16 moves upwardly the latch arm 18 will be the first to be released and will be forced by the spring 22 to close contacts 23 and 24, thus completing a circuit from the source represented by conductors 6—7 through a high impedance indicating device such as a lamp 25 and a resetting coil 26 of the relay 12. The closing of this circuit notifies the operator that the apparatus is loaded nearly to its maximum capacity, thus giving an opportunity to rearrange the load and prevent further increase in the heating of the apparatus.

Figure 2:
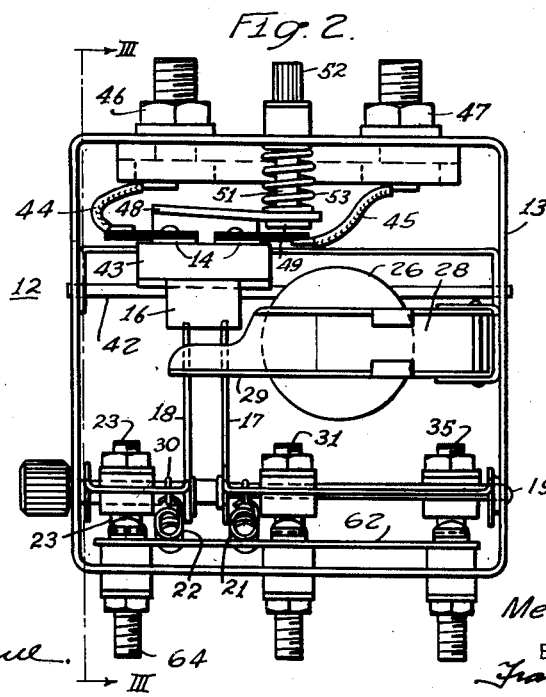
Fig. 2 is an enlarged end view of the relay device diagrammatically illustrated in Fig. 1.

When the apparatus is so unloaded and it is desired to reset the latch arm 18, a switch 27 that is provided in shunt relation to the lamp 25 may be closed, thus shunting the lamp from the above-traced circuit and increasing the energization of the coil sufficiently to cause it to operate its associated armature 28 and an arm 29 controlled thereby to return the latch 18 to its initial position, as will be further described in detail. The armature 28 and the arm 29 actuated thereby for engaging the latch arms 17 and 18 are best shown in Figs. 2, and 3, and are omitted from Fig. 1 for the sake of simplicity.

Should the overload on the apparatus continue sufficiently for the bimetal element 14 to continue the upward movement of the catch 16, the latch arm 17 will be released and operated by the spring 21 to cause movement of the contact member 31 into engagement with the contact member 32 to close a circuit through the opening winding 33 of the breaker 11, to actuate the contact members 34 from their circuit closing positions and interrupt the load circuit through the apparatus. When the apparatus has cooled sufficiently to permit return of the catch member 16 to a position to engage the latch arms 17 and 18, operation of the switch 27 to its circuit closing position to shunt the indicating device 25 from the indicating circuit and increase the energization of the coil 26 will effect movement of both latches 17 and 18 to their illustrated position to again be retained by the catch 16 until released by further operation. Upon return of the latch arm 17 to its latched position, a circuit is closed through contact members 35 and 36 for energizing the closing coil 37 of the circuit breaker 11, operating the contact members 34 to their circuit closing positions. The circuit through the contact members 35 and 36 may be so arranged that these contact members close one point only in the circuit, the final completion of the circuit being made by a manually operated switch after the circuit has been conditioned by closing of members 35 and 36.

The description thus far has been directed largely to the circuits and basic elements of the apparatus shown diagrammatically in Fig. 1. The detailed arrangement of the parts of the relay device 12 is shown in greater detail in the remaining figures of the drawings.

Figure 3:
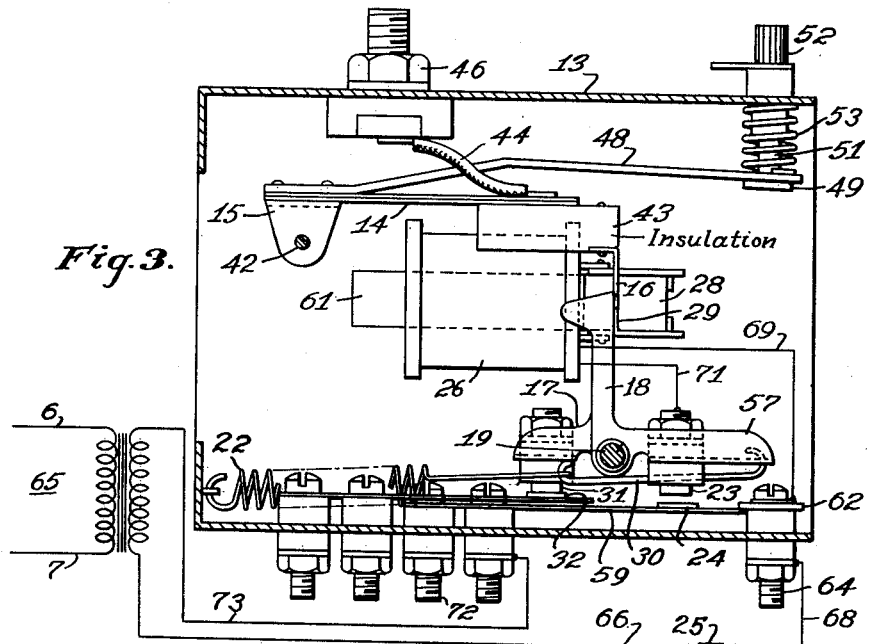
Fig. 3 is a diagrammatic view, partly in section, of the thermally controlled relay taken along the dot and dash line III—III in Fig. 2, connected to a manually operating resetting switch shown in section taken along the dot and dash line III—III of Fig. 5.
Figure 4:
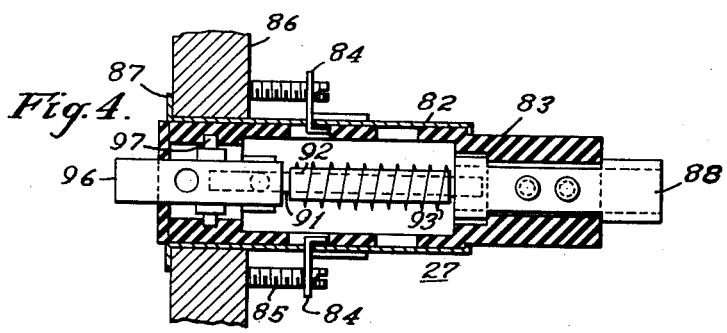
Fig. 4 is a longitudinal sectional view of the resetting switch taken along the dot and dash line IV—IV of Fig. 5.
Figure 4:
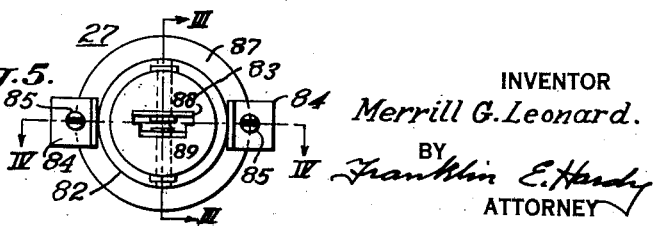

Referring particularly to Fig. 3, the bimetal element 14 is positioned with its relatively fixed end mounted on a yoke 15, the other end of which carries a block of insulating material 43 upon which is mounted the catch 16. The yoke 15 is mounted on a shaft 42 carried by the casing 13 and is provided with an adjustable arm 48 for positioning the bimetal element so that the latch will become effective to release the latches at selected predetermined temperatures. The outer end of the arm 48 is positioned by being held between the head 49 of a bolt 51 and a spring 53. An adjusting nut 52 is provided at the upper end of the bolt for adjusting the position of the arm 48. The relay device is normally positioned within an electrical apparatus, such as a transformer containing a cooling and insulating liquid which also surrounds the bimetal element 14. This element may be arranged to be heated both by such liquid and by current flowing through the bimetal element through a circuit connected from terminals 46 and 47 through conductors 44 and 45, such current being a measure of the current in the load circuit of the apparatus.

A latch arm 18 is provided mounted on a shaft 19 that is held by the casing 13, the upper end of the arm 18 being normally retained by the catch 16. The latch arm 18 is provided with a horizontal portion 57 carrying the contact member 23 which is adapted to engage the contact member 24 carried by leaf spring 59 that is mounted on two studs 72. The outer end of the leaf spring 59 normally engages an insulating strip 62 mounted on a stud 64 mounted on the casing as one terminal of the resetting control circuit. The resetting mechanism includes the resetting coil 26 for energizing a core 61 and actuating the associated armature 28 so as to bring the operating arm 29 against the latch arms 17 and 18 after they have been released by the catch 16 to return them to their illustrated positions. The second latch 17 is provided for controlling the main circuit breaker and its operation has been generally described with respect to Fig. 1, and will not now be described in further detail. The latch arm 17 is generally similar in construction to the latch arm 18, and the two latch devices may be so adjusted that they will be released by different amounts of upward movement of the catch 16, as operated by the bimetal element 14.

If the electrical apparatus being protected is heated sufficiently that the bimetal 14 moves the catch 16 upwardly until the latch 18 is released, the latch will be actuated by a spring 22 and link 30 to cause engagement of the contact members 23 and 24 to close a circuit from a source represented at 65 through conductor 66, a lamp or similar high impedance indicating device 25, conductor 68, stud 64, conductor 69, the coil 26, conductor 71, contact members 23 and 24, leaf spring 59, stud 72, and conductor 73 to the source 65. The device 25 when energized gives an indication that the electrical apparatus is loaded nearly to its permissible limit, and that if measures are not taken to prevent a further increase in load, the load circuit will be interrupted automatically upon a slight increase in the apparatus load. As above explained, in order to energize the coil 26 sufficiently to effect its operation to reset the latch 18, or both of the latches 17 and 18, as may be required, it is necessary to shunt the device 25 from the above-traced circuit. This is done by means of a manually operable switch indicated generally at 27.

The switch assembly 27 includes a metal housing 82 surrounding a molded case 83 from which lugs 84 extend outwardly for accommodating screws 85 by means of which the assembly is attached to a mounting panel 86 shown positioned between the ends of the screws 85 and an outwardly extending flange 87 in the end of the housing 82.

Terminal members 88 and 89 are provided and extend through one end of the molded case 83. A bimetal element 91 is attached at 90 to the inner end of the terminal 89 and a heat resistant tube 92 is positioned about the bimetal element. Such tube may be formed of woven glass material. A heating coil 93 is wound about the tube 92. The switch is provided with a contact member 94 carried by the bimetal element 91, and a contact member 95 carried by a manually operable handle 96 mounted on a pivot pin 97, and normally held in its illustrated or open circuit position by a spring 98 extending between the handle 96 and the molded case. The handle 97 extends through an opening in the molded case which is so formed as to provide a stop at 99 to limit the movement of the handle in the direction to effect the closing of the switch.

When it is desired to energize the resetting coil 26, the handle 96 of the resetting switch is moved upwardly against the stop 99 as viewed in Fig. 3, thus bringing the contact member 95 into engagement with the contact member 94 and closing a circuit in shunt to the device 25 through the bimetal element 91, the heating coil 93, the terminals 88 and 89 and conductors 100. This causes immediate energization of the resetting device actuating the armature 28 and the lever 29 to bring the latch arm devices 17 and 18 to their illustrated positions, in which they are normally held by the catch 16. If the bimetal element 14 has sufficiently cooled so that the catch 16 has moved downwardly a sufficient distance to retain the latch devices in their illustrated positions, the resetting operation is complete. If, however, the bimetal element has not yet cooled, and the shunt circuit through contact members 94 and 95 remain closed, the repeated operations of the latch 18 between its open circuit and closed circuit positions above described will occur. The heating of the bimetal element 91 causes the contact member 94 to separate from the contact member 95 to interrupt the shunt circuit about the device 25 so that the latches 17 and 18 will be permitted to remain in their unlatched positions for a certain period of time after having been operated to their normally latched positions and not retained in that position. The heat retaining tube 92 by limiting the rate of heat radiation from the bimetal 91, and the heating coil 93 by applying additional heat thereto, cause the bimetal element 91 to be heated to a higher temperature, and to retain its heat for a longer period of time than would be the case if these elements were not present. The result is that the contact member 94 moves further from the contact member 95 to insure a wider separation of these contacts, and the contacts remain separated for a longer period of time, during which interval the resetting coil 26 will not be again energized. When the contact member 94 again engages the contact member 95, the resetting coil 26 will again be energized, and if the interval of time has not been sufficient to permit the bimetal element 14 to cool sufficiently so that the catch 16 retains the latch arms 17 and 18 in their illustrated positions the bimetal element 91 will again be heated sufficiently to repeat the operation above described. Thus, the operator may move the handle 96 against the stop 99 and retain it in that position without fear of damaging the apparatus.

It will be apparent to those skilled in the art that modifications in the circuit and apparatus illustrated and described may be made within the spirit of my invention, and I do not wish to be limited otherwise than by the scope of the appended claims.

I claim as my invention:

1. In combination, an electrical apparatus, protective means therefor including a circuit breaker for closing a circuit upon a predetermined condition of the apparatus, a high impedance element in said circuit, means in said circuit operable upon the shunting of said high impedance element from said circuit for resetting the circuit breaker to its initial position, and a switch device for shunting said high impedance element from said circuit comprising a pair of contact members, means for moving one of said contact members into engagement with the other for closing said shunt circuit, and means in series circuit therewith and responsive to the flow of current through said contact members to effect a relatively wide separation between the contact members and a relatively long time interval between their separation and reclosing.

2. In combination, an electrical apparatus, protective means therefor including a circuit breaker for closing a circuit upon a predetermined condition of the apparatus, a high impedance element in said circuit, means in said circuit operable upon the shunting of said high impedance element from said circuit for resetting the circuit breaker to its initial position, and a switch device for shunting said high impedance element from said circuit comprising a pair of contact members, one of said contact members being mounted on a resilient support and the other contact member being mounted on a manually movable member for movement to a predetermined position in engagement with the first named contact member, and thermal means responsive to the current flow through said contact members for moving the first named contact member to effect separation of the contact members after a predetermined time of current flow therethrough, and to effect a return movement of the first named contact member to its former circuit closing position after a further predetermined time interval.

3. In combination, an electrical apparatus, protective means therefor including a circuit breaker for closing a circuit upon a predetermined condition of the apparatus, a high impedance element in said circuit, means in said circuit operable upon the shunting of said high impedance element from said circuit for resetting the circuit breaker to its initial position, and a switch device for shunting said high impedance element from said circuit comprising a pair of contact members, one of said contact members being mounted on a resilient support and the other contact member being mounted on a manually movable member for movement to a predetermined position in engagement with the first named contact member, a bimetal element thermally responsive to the current flowing through said contact members for moving the first named one of said contact members to effect separation thereof after a predetermined duration of current flow therethrough, and to effect a return movement of the first named contact member to its former circuit closing position after a further predetermined time interval.

4. In combination, an electrical apparatus, protective means therefor including a circuit breaker for closing a circuit upon a predetermined condition of the apparatus, a high impedance element in said circuit, means in said circuit operable upon the shunting of said high impedance element from said circuit for resetting the circuit breaker to its initial position, and a switch device for shunting said high impedance element from said circuit comprising a pair of contact members, one of said contact members being mounted on a resilient support and the other contact member being mounted on a manually movable member for movement to a predetermined position in engagement with the first named contact member, a bimetal element thermally responsive to the current flowing through said contact members for moving the first named one of said contact members to effect separation thereof after a predetermined duration of current flow therethrough, and to effect a return movement of the first named contact member to its former circuit closing position after a further predetermined time interval, a tube of temperature resistant material about the bimetal and a heating coil about the tube connected in series with said contact members to increase the heat applied to the bimetal and provide a relatively long time interval between the separation and subsequent engagement of said contact members.

5. In a protective system for electrical apparatus, in combination, a device responsive to predetermined conditions, a thermally responsive element movable in accordance with variations in said conditions, a movable circuit controlling element biased to a circuit closing position and means for latching said element in a restrained circuit interrupting position, a circuit closed by said circuit controlling element upon the unlatching thereof by said thermally responsive element, said circuit including a high impedance indicating device and a resetting device, and a switch device for shunting said high impedance element from said circuit comprising a pair of contact members, means for moving one of said contact members into engagement with the other for closing said shunt circuit, and means in series circuit therewith and responsive to the flow of current through said contact members to effect a relatively wide separation between the contact members and a relatively long time interval between their separation and reclosing.

6. In a protective system for electrical apparatus, in combination, a device responsive to predetermined conditions, a thermally responsive element movable in accordance with variations in said conditions, a movable circuit controlling element biased to a circuit closing position and means for latching said element in a restrained circuit interrupting position, a circuit closed by said circuit controlling element upon the unlatching thereof by said thermally responsive element, said circuit including a high impedance indicating device and a resetting device, and a switch device for shunting said high impedance element from said circuit comprising a pair of contact members, one of said contact members being mounted on a resilient support and the other contact member being mounted on a manually movable member for movement to a predetermined position in engagement with the first named member, and thermal means responsive to the current flow through said contact members for moving the first named one of said contact members to effect separation thereof after a predetermined time during current flow therethrough and to effect a return movement of the first named contact member to its former circuit closing position after a further predetermined time interval.

7. In a protective system for electrical apparatus, in combination, a device responsive to predetermined conditions, a thermally responsive element movable in accordance with variations in said conditions, a movable circuit controlling element biased to a circuit closing position and means for latching said element in a restrained circuit interrupting position, a circuit closed by said circuit controlling element upon the unlatching thereof by said thermally responsive element, said circuit including a high impedance indicating device and a resetting device, and a switch device for shunting said high impedance element from said circuit comprising a pair of contact members, one of said contact members being mounted on a resilient support and the other contact member being mounted on a manually movable member for movement to a predetermined position in engagement with a first named member, a bimetal element thermally responsive to the current flowing through said contact members for moving the first named one of said contact members to effect separation thereof after a predetermined duration of current flow therethrough, and to effect a return movement of the first named contact member to its former circuit closing position after a further predetermined time interval.

8. In a protective system for electrical apparatus, in combination, a device responsive to predetermined conditions, a thermally responsive element movable in accordance with variations in said conditions, a movable circuit controlling element biased to a circuit closing position and means for latching said element in a restrained circuit interrupting position, a circuit closed by said circuit controlling element upon the unlatching thereof by said thermally responsive element, said circuit including a high impedance indicating device and a resetting device, and a switch device for shunting said high impedance element from said circuit comprising a pair of contact members, one of said contact members being mounted on a resilient support and the other contact member being mounted on a manually movable member for movement to a predetermined position in engagement with a first named member, a bimetal element thermally responsive to the current flowing through said contact members for moving the first named one of said contact members to effect separation thereof after a predetermined duration of current flow therethrough, and to effect a return movement of the first named contact member to its former circuit closing position after a further predetermined time interval, a tube of high thermal temperature coefficient material about the bimetal and a heating coil about the tube connected in series with said contact members to increase the heat applied to the bimetal and provide a relatively long time interval between the separation and subsequent engagement of said contact members.

MERRILL G. LEONARD.